(12) United States Patent
Yourtee et al.

(10) Patent No.: US 8,850,263 B1
(45) Date of Patent: Sep. 30, 2014

(54) STREAMING AND SAMPLING IN REAL-TIME LOG ANALYSIS

(75) Inventors: Kendra A. Yourtee, Seattle, WA (US); Amos Dylan Vance, Redmond, WA (US); Muhammad Ali Siddiqui, Snoqualmie, WA (US); Alexander S. Borst, Seattle, WA (US); Miles C. Kaufmann, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 192 days.

(21) Appl. No.: 13/619,344

(22) Filed: Sep. 14, 2012

(51) Int. Cl.
*G06F 11/00* (2006.01)

(52) U.S. Cl.
USPC ............................................ 714/20; 714/47.3

(58) Field of Classification Search
CPC ............ G06F 11/3476; G06F 11/1471; G06F 11/0766
USPC .................................................. 714/20, 47.3
See application file for complete search history.

(56) References Cited

U.S. PATENT DOCUMENTS

| | | | |
|---|---|---|---|
| 8,271,804 B2 * | 9/2012 | Kudo ............................ | 713/193 |
| 2004/0153770 A1 * | 8/2004 | Lindsay et al. ................. | 714/20 |
| 2007/0157302 A1 * | 7/2007 | Ottamalika et al. ............ | 726/11 |
| 2009/0089592 A1 * | 4/2009 | Kudo ............................ | 713/193 |
| 2010/0070769 A1 * | 3/2010 | Shima et al. ................... | 713/171 |
| 2011/0246826 A1 * | 10/2011 | Hsieh et al. ..................... | 714/20 |
| 2011/0314297 A1 * | 12/2011 | Jakobsson ...................... | 713/189 |
| 2012/0246303 A1 * | 9/2012 | Petersen et al. ............... | 709/224 |
| 2013/0227352 A1 * | 8/2013 | Kumarasamy et al. ....... | 714/47.1 |

* cited by examiner

*Primary Examiner* — Yolanda L Wilson
(74) *Attorney, Agent, or Firm* — Hope Baldauff, LLC (57) ABSTRACT

Technologies are described herein for incorporating streaming and/or sampling in real-time log analysis. Representative samples of log data are extracted from the log files on a number of monitored hosts and streamed in real-time to log processors for processing. The log processors accumulate and process the representative samples of log data, and track a data completeness value representing an indication of a proportion of total log data represented by the representative samples received. The representative samples of log data are merged and collated. Estimated metrics are calculated from the merged and collated representative samples and the data completeness, and the estimated metrics are published to consumers in near real-time.

31 Claims, 4 Drawing Sheets

STREAMING AND SAMPLING IN REAL-TIME LOG ANALYSIS

BACKGROUND

Real-time Log Analysis ("RTLA") may allow an organization to monitor the service and error logs of a number of host computers and devices in near-real time in order to spot trends in service performance or customer demand as well as to troubleshoot potential problems. An RTLA system may collect log data from the host computers and devices, process and collate the collected data and analyze the collated data to generate service metrics. These metrics may then be published to host management systems, alarming and alerting services, reporting and graphing services and support services. The generated metrics may include fatal error counts/rates, page views, service availability, host access rates, hardware performance measures and the like. Management and support personnel may utilize the published metrics and processed and collated log data to be alerted to potential problems or failures, troubleshoot host or service problems, determine additional resources that need to be made available to meet growing demand, spot trends in service or product demand and the like.

In an RTLA system that monitors a large number of services and/or hosts, the high volume of log data collected, processed and analyzed may result in an unacceptable latency between the logging of events/errors and publishing of the related metrics. For example, in a system comprising tens of thousands of host computers, the RTLA system may collect and process multiple terabytes of log data daily, and may incur a latency between the logging of events/errors and the generation and publishing of the related metrics on the order of several minutes, such as 8 to 10 minutes. In addition, a sudden increase in log volume due to external events, such as a denial-of-service ("DoS") attack or deployment of bad code, may further increase the latency in the RTLA system, delaying investigation and analysis of potential problems. Such a delay in investigation and resolution of problems may result in prolonged service unavailability, leading to significant loss of revenue, violation of service level agreements and the like.

It is with respect to these and other considerations that the disclosure made herein is presented.

DETAILED DESCRIPTION

The following detailed description is directed to technologies for incorporating streaming and/or sampling in real-time log analysis. Utilizing the technologies described herein, an organization may augment or replace an RTLA system with smart sampling of log data as well as streaming of log data in real-time to make estimated metrics and representative log data available to consumers with reduced latency. Smart sampling of the log data may reduce the volume of log messages that must be processed while retaining the data of interest to the consumers from the logs. Furthermore, coupling smart sampling with streaming of the sampled log data from the monitored hosts to the back-end services for processing may reduce the latency between the logging of events/errors at the hosts and the publishing of estimated metrics and representative data to the consumers to near real-time, i.e. to seconds instead of minutes, for example. This may allow consumers of the estimated metrics to immediately identify trends or patterns in the metrics that may require immediate response, such as an indication of a pending failure or problem, a spike in demand requiring quick provisioning of additional resources to reduce service unavailability, an indication of a security breach or DoS attack and the like.

It should be appreciated that the subject matter presented herein may be implemented as a computer process, a computer-controlled apparatus, a computing system or an article of manufacture, such as a computer-readable storage medium. These and various other features and embodiments will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types. Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, cellular telephone devices, electronic-book readers, special-purposed hardware devices, network appliances and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Figure 1:
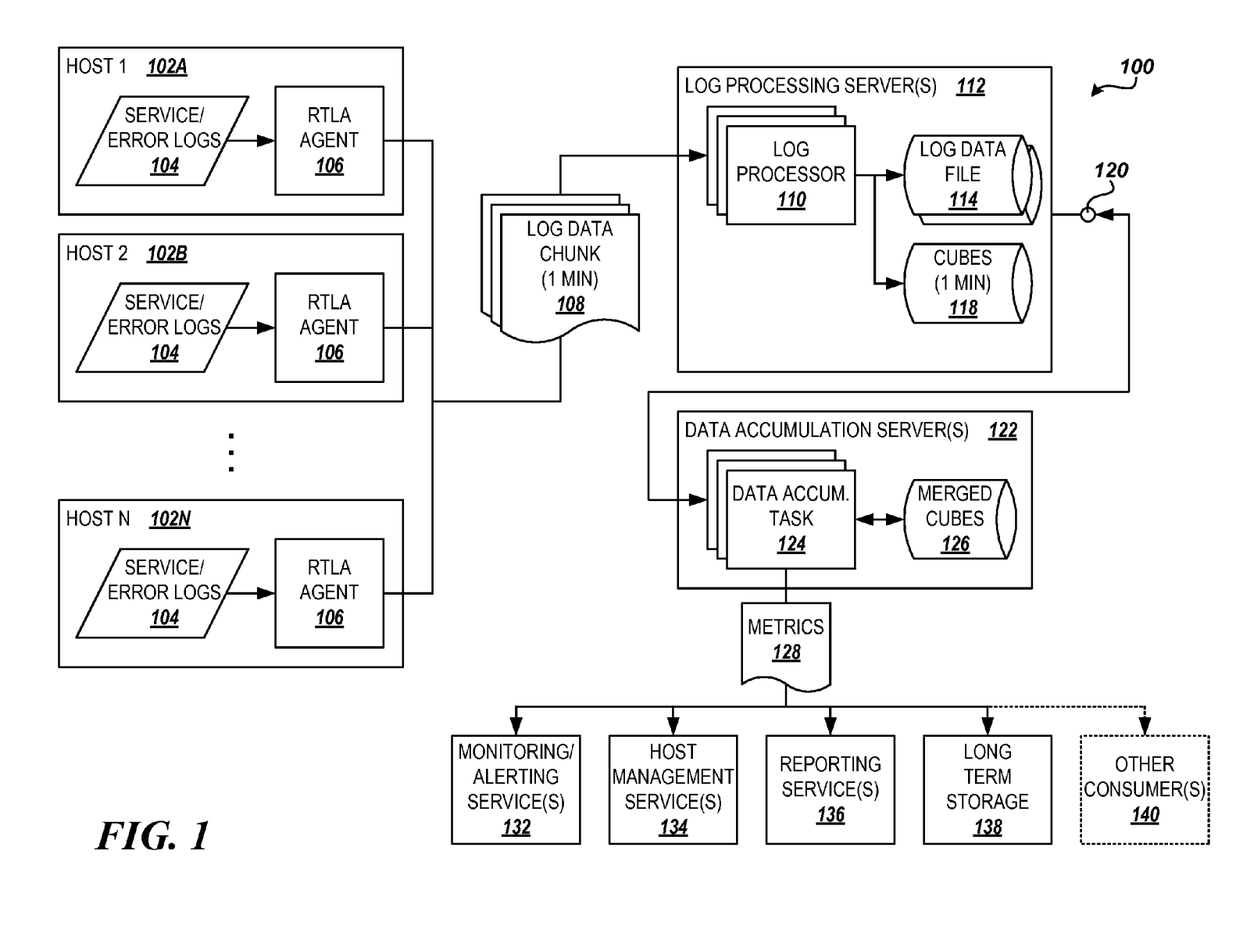
FIG. 1 is a system diagram showing aspects of an illustrative operating environment for performing real-time log analysis, including several software and hardware components provided by embodiments presented herein.

FIG. 1 and the following description are intended to provide a brief, general description of suitable computing environments in which the embodiments described herein may be implemented. In particular, FIG. 1 shows an illustrative operating environment 100 including several software components for performing real-time log analysis ("RTLA"), according to embodiments provided herein. The environment 100 includes a number of monitored hosts, such as host 1 102A through host N 102N (referred to herein generally as host 102 or hosts 102). The hosts 102 may comprise application servers, Web servers, database servers, communication servers, personal computers, network appliances or any other computing device known in the art. The hosts 102 may further represent virtual machines executing on a host hardware platform. The hosts 102 may execute any number of services and/or applications known in the art, such as Web services, database services, application services, storage services, data processing services and the like. As is further known in the art, the services and/or applications executing on the host 102 may log errors and other events in service and error logs 104 on the host. The service and error logs 104 may include service event logs, application event logs, access logs, hardware event logs and the like.

Each host 102 may execute an RTLA agent 106. The RTLA agent 106 may be implemented as software, hardware or any combination of the two. According to embodiments, the RTLA agent 106 may scan service and error logs 104 on the host 102 for particular types of log messages generated by the executing services and applications or the host hardware. For example, the RTLA agent 106 may be configured to scan the service and error logs 104 to identify fatal errors, such as HTTP 500 errors from a Web service or internal application failures from an application executing on the host. The RTLA agent 106 may further periodically collect the identified log messages, also referred to herein as "log data," from the various service and error logs 104 and transmit the log data to a number of log processors 110 executing on one or more log processing server(s) 112. In some embodiments, the RTLA agent may be further configured to identify and filter data from the log messages that may be more interesting to consumers of the RTLA data. For example, the RTLA agent may be configured to report log messages having the same signature fatal error only once, or in the case of a series of fatal errors, only extract the stack trace from the associated log message(s), for example.

The log processing server(s) 112 may represent conventional server computers, virtual machines executing on a host hardware platform, network appliances or any combination of these and other computing devices. The log processing server(s) 112 may be connected to the host computers by one or more networks (not shown) for example. The log processors 110 may represent one or more software or hardware modules executing on the log processing server(s) 112 and/or other computing platforms. The RTLA agent 106 may transmit the log data collected on the host 102 to particular log processor(s) 110 or log processing server(s) 112 based on local configuration parameters, for example. In some embodiments, the RTLA agent 106 may select the log processor(s) 110 to which to transmit the log data based on the particular service or error log 104 from which the log data was extracted and/or the like. According to some embodiments, the RTLA agents 106 may collect the log data from the service and error logs 104 at a configured interval, such as every minute, and transmit the log data to the log processors 110 in one minute log data chunks 108. It will be appreciated that other intervals beyond one minute may be configured, and that the interval may affect the latency of making representative data and metrics available to consumers from the service and error logs 104 of the hosts 102 in the RTLA system.

The log processors 110 may receive the log data chunks 108 and split the log data into one or more databases or log data files 114, such as data tables, indexes and the like. The log processors 110 may further provide the processed log data in data cubes 118. The dimensions in the data cubes 118 may include host ID, host type, host session, page ID, page type, request ID, request type, customer ID, source log and/or other categories of the logged messages. The log data may be accumulated in log data files and the data cubes 118 over the configured interval of each log data chunk 108, producing one minute data cubes, for example. In further embodiments, the log processors 110 may summarize dimensions over total log data, and not just the identified fatal error log messages, for example.

The processed log data in the log data files 114 and data cubes 118 for the configured interval may then be made available to other services for consumption, as will be described below. For example, the log processing server(s) 112 may provide an application programming interface ("API") 120 for the consumption of the log data files 114 and the data cubes 118. Additionally or alternatively, the log processing server(s) 112 may push the processed log data in the log data files 114 and/or the data cubes 118 to other services for consumption, such as a long-term storage service (not shown) that may store the received log data chunks 108 and/or the processed log data in the log data files 114 and data cubes 118 for future analysis.

The environment 100 may further include one or more data accumulation server(s) 122. The data accumulation server(s) 122 may represent conventional server computers, virtual machines executing on a host hardware platform, network appliances or any combination of these and other computing devices. The data accumulation server(s) 122 may be connected to the log processing server(s) 112 by one or more networks (not shown). A number of data accumulation tasks 124 may execute on the data accumulation server(s) 122. The data accumulation tasks 124 may represent one or more software or hardware modules executing on the log processing server(s) 112 and/or other computing platforms.

The data accumulation tasks 124 may pull the data cubes 118 and associated log data files 114 from the log processing server(s) 112 and generate merged cubes 126. The merged cubes 126 may comprise log data from multiple log processing servers(s) 112 or log processors 110 merged across hosts 102, across multiple configured intervals and the like. In addition, the data accumulation tasks 124 may collate the log data in the merged cubes across one or more dimensions. For example, a single request, identified by a request ID, may result in fatal error messages logged in multiple service and error logs 104 or across multiple hosts 102, such as in the case where the request is received by a Web service, and then issues multiple requests to other services to collect content to satisfy the original request. The data accumulation tasks 124 may collate the multiple log messages from across the hosts 102 and/or service and error logs 104 by request ID, in order to eliminate redundant fatal errors for a single request.

The data accumulation tasks 124 may then utilize the merged cubes to generate a number of configured metrics 128 and other accumulated log data for the monitored hosts 102. Such metrics may include fatal error rates over time, error rates by function or module, request counts and latency, hardware errors, security metrics, CPU utilization, free memory and available storage space and any other metrics that may be determined from the log data. The data accumulation tasks 124 may further be configured to utilize consumer-configured log messages generated by services and applications executing on the monitored hosts 102 to calculate customizable metrics, such as access rates by webpage, views by product, access by region or location, access by user demographic, inventory usage or spoilage and/or any other measure that may be important to business or operational performance of the services and applications on the monitored hosts 102.

The generated metrics 128 and other accumulated log data may then be published to consumers of the RTLA data, as discussed above. Consumers of the RTLA data may include monitoring/alerting service(s) 132 that may be configured to alert administrative or support personnel when one or more metrics 128 are out of bounds or when a trend in the metric is noticed; host management service(s) 134 that may include the ability to provision and initiate additional hosts, services and/or other resources in response to the metrics or trends in the metrics; reporting service(s) 136 that provide administrative or support personnel insight into the operations of the hosts and allow investigation of failures or other problems; long term storage 138 so that the metrics and other accumulated log data may be stored over longer periods for future analysis; and any other consumers 140 of the RTLA data that may be imagined by one skilled in the art.

In some embodiments, the data accumulation tasks 124 may wait a configured period of time, such as 3 or 5 minutes, before retrieving the log data from the log data files 114 and/or data cubes 118 from the log processing server(s) 112, in order to allow the log data chunks 108 from the various hosts 102 to arrive at the log processing server(s) 112 data and to be processed by the log processors 110. The configured period of time may further add to the latency of the metrics 128 and other log data being made available to consumers. In addition, depending on the destination, the publishing of the metrics 128 and other accumulated log data may further add to the latency of the data before consumption.

Figure 2:
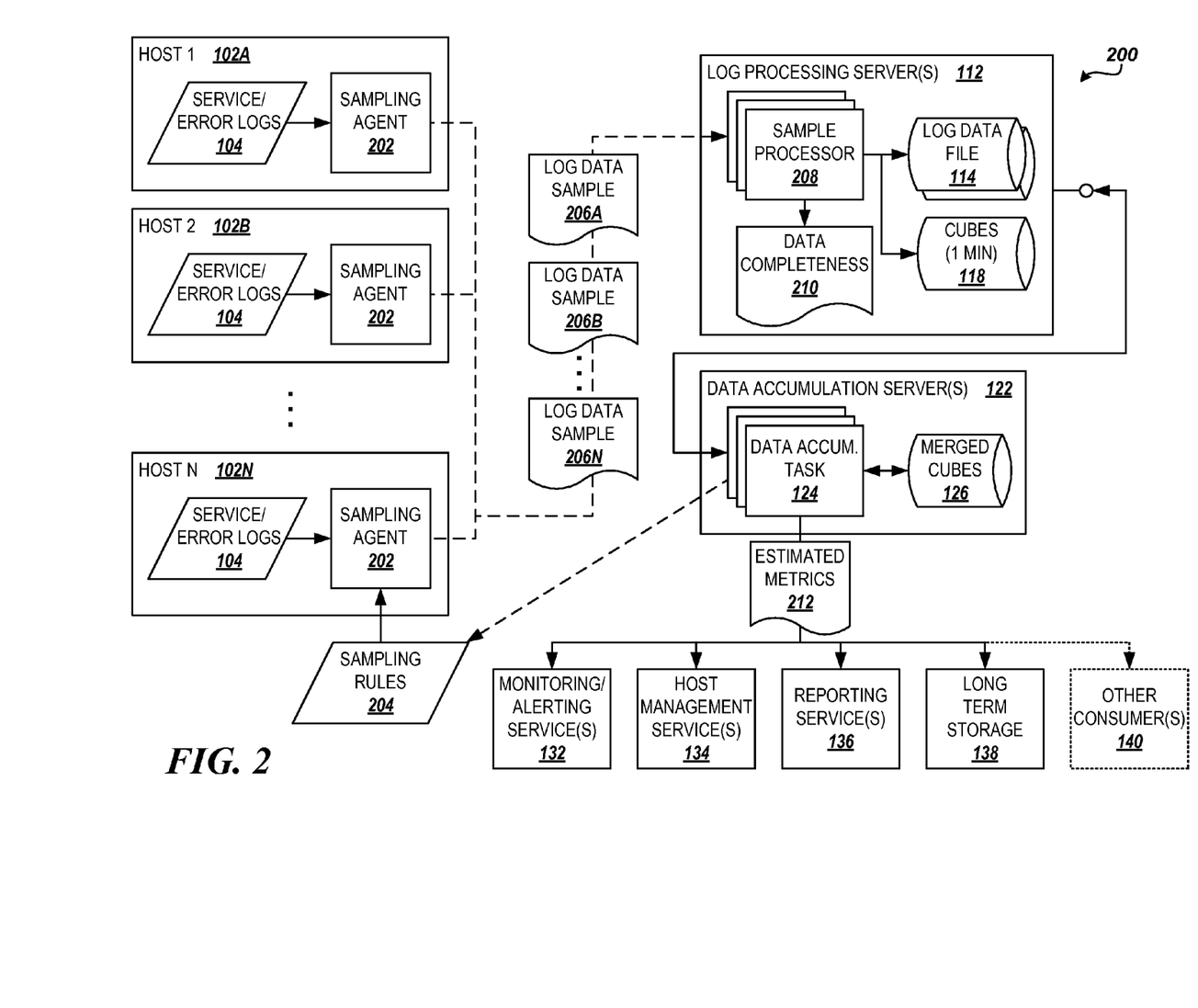
FIG. 2 is a system diagram showing further aspects of an illustrative operating environment for performing real-time log analysis incorporation smart sampling and streaming, as described by embodiments presented herein.

FIG. 2 shows another illustrative operating environment 200 including several software components for incorporating streaming and/or sampling in the real-time log analysis, according to embodiments. The system and components of the environment 200 shown in FIG. 2 may be implemented to augment or enhance an existing RTLA system, such as that shown in FIG. 1, or to replace components of the RTLA system, for example. As described above in regard to FIG. 1, the environment 200 includes the monitored hosts 102 containing the service and error logs 104.

Each host 102 may execute a sampling agent 202. The sampling agent 202 may be implemented as software, hardware or any combination of the two. The sampling agent 202 may be implemented as a component of the RTLA agent 106 or execute in parallel to the RTLA agent, for example. According to embodiments, the sampling agent 202 samples the service and error logs 104 on the host 102 to extract a portion of the log messages for further processing. In some embodiments, the sampling agent 202 may extract a representative sample of log messages from the service and error logs 104 for processing, such as a random 10% of the log messages or every tenth logged message, for example. In other embodiments, the sampling agent 202 may apply more complex statistical sampling methods and heuristics to extract the representative sample.

According to some embodiments, the sampling agent 202 may utilize a hashing algorithm to sample the log messages from the service and error logs. For example, a hash may be computed from a value present in every sampled log message, such as a request ID or a timestamp, and a tag added to the log message with the hashed value. The sampling agent 202 may then sample those log messages containing a particular hash value or range of hash values for the representative sample. For example, the sampling agent may apply a MOD 10 operation to the hash value tag and select those log messages that result in 0 for extraction. The use of the hashing algorithm to sample the log messages may have the added advantage that log messages from different service and error logs 104 and/or different hosts 102 generated from the same request, i.e. having the same request ID, will all be included in the extracted representative sample. These log messages can then be combined/collated by the accumulation tasks 124 across the hosts 102 and/or service and error logs 104 by the request ID in order to eliminate redundant fatal errors for a single request, as described above in regard to FIG. 1.

In further embodiments, the sampling agent 202 may additionally or alternatively utilize sampling rules 204 to apply "smart" sampling logic to the log messages of the service and error logs 104, in addition to or as an alternative to the heuristics and statistical sampling described above. The sampling rules 204 may comprise regular expressions ("regex"), query language statements, code statements, XML statements and/or the like that allow patterns in the service and error logs 104 to be matched in order to sample or extract data from targeted log messages that has been identified as being of particular interest. The sampling rules 204 may further comprise rules that indicate data or patterns in log messages that are not to be included in the extracted representative sample or that are to be sampled with less frequency than other log messages.

In some embodiments, the sampling rules may contain patterns that correspond to particular metrics defined for generation by the data accumulation tasks 124. For example, if a rising trend in accesses from a certain geographical region has been determined to be an accurate indicator of a DoS attack, then a metric for access by geographical region may be configured in the data accumulation tasks, and a sampling rule 204 comprising a pattern to match logged access messages and extract the geographical region or to match the identified offending region may be pushed to the hosts 102 for use by the sampling agents 202 in sampling the service and error logs 104. The sampling rules 204 may be dynamic, allowing new rules to be pushed to the hosts 102 on a real-time basis to change or tweak the types of log messages targeted, the data to be extracted from the targeted log messages, the percentage of log messages being sampled by the sampling agents 202 and the like. In further embodiments, the smart sampling logic may be combined with the identification and filtering logic of the RTLA agents 106 described above to further filter the data sampled from the log messages.

The sampling agents 202 may further stream the sampled log data in log data samples 206A-206N (also referred to herein as log data samples 206) to one or more sample processors 208. The sample processors 208 may represent one or more software or hardware modules executing on the log processing server(s) 112 and/or other computing platforms. The sample processors 208 may be a component of the log processors 110 described above in regard to FIG. 1, or the sample processors may execute in parallel to the log processors on the log processing server(s) 112, for example. Each log data sample 206 may contain a small amount of data comprising one or more sampled log messages or portions thereof, and the sampling agent 202 may stream the log data samples 206 in real-time using any number of multicast and/or streaming protocols known in the art. It will be appreciated that the latency incurred by the periodic collection and transmission of the log data chunks 108 described above may be reduced or eliminated by streaming the log data samples 206 to the log processing server(s) 112 in real-time.

In some embodiments, specific sample processors 208 may subscribe to receive log data samples 206 from specific sampling agents 202 or hosts 102. In other embodiments, the sample processors 208 may "listen" for log data samples 206 in the stream containing specific hash value tag(s) generated by the sampling agents 202, as described above. This may allow the processing of the log data samples 206 to be load-balanced across multiple sample processors 208 and/or log processing server(s) 112. It will be appreciated that other methods for delivering the log data samples 206 to the sample processor 208 for processing may be imagined, such as the selection of the target sample processor by the sampling agent 202 based on configuration parameters and/or the hash value tag computed for each log message and delivery of the log data samples to the target sample processor. It is intended that all such methods for delivering the log data samples to the sample processor be included in the scope of this application.

As in the case of the log processors 110, the sample processors 208 may split the sampled log data in the log data samples 206 into a number of files and/or databases, such as the log data files 114 and the data cubes 118 described above in regard to FIG. 1. In some embodiments, the sampled log data may be accumulated in the log data files and data cubes 118 over the same or similar configured interval as in the RTLA system described above, such as one minute. However, the sampled log data in the log data files 114 and the data cubes 118 may be made available to the data accumulation tasks 124 right away for collation and loading into the merged cubes 126. This may eliminate the latency added by the configured period of time that the data accumulation tasks 124 wait to allow the log data chunks 108 from the various hosts 102 to arrive at the log processing server(s) 112 data and to be processed by the log processors 110, as further described above in regard to FIG. 1.

The sample processors 208 may further maintain a measure of data completeness 210 that indicates the proportion or percentage of total log data represented by the sampled log data received from the sampling agents and loaded into the log data files 114 and the data cubes 118. The data completeness 210 may be calculated from information received from the sampling agents 202 regarding the sampling rate or the size of the samples, for example. The data completeness 210 may be utilized by the data accumulation tasks 124 and other consumers of the processed log data to calculate estimated metrics 212 over the configured interval from the portion or percentage of sampled log data processed by the sample processors 208 and loaded into the merged cubes 126. The data accumulation tasks 124 may then publish the estimated metrics 212 to consumers that subscribe to the estimated metrics. This may include the monitoring/alerting service(s) 132, the host management service(s) 134, the reporting services 136, the long term storage 138, and other consumers 140 that have interest in estimates of the metrics being made available with a latency on the order of seconds instead of the 8 to 10 minutes described above.

In some embodiments, the data accumulation tasks 124 may be further configured to determine patterns or trends in the sampled log data, such as the occurrence of a particular error, and generate new or updated sampling rules 204 which may then be fed back to the sampling agents 202, as further shown in FIG. 2. This may allow for a feedback loop to be implemented that allows the data accumulation tasks 124 to recognize patterns that indicate a pending event or events, such as a pending failure, and adjust the sampling process to generate more pertinent data for the event(s). Alternatively or additionally, the sample processors 208 may also be configured to recognize the patterns or trends and generate the new or updated sampling rules 204. For example, upon detecting a commonly occurring error, the sampling rules 204 may be updated such that the log entries resulting from the common error are not extracted by the sampling agents 202 as frequently as other errors, to avoid potential masking of the less common errors in the representative samples.

It will be appreciated that the estimated metrics 212 generated from the sampled log data may allow the consumers to react more quickly to trends and patterns in the metrics that may indicate an impending failure or condition in the operation of the hosts 102. In addition, complete/correct metrics 128 may be made available by the data accumulation tasks 124 for the full log data processed by the log processors 110 at a later time, such as the 8 to 10 minute latency described above, allowing administrative and support personnel to verify the failure or condition, while having the forewarning provided by the estimated metrics 212 derived from the sampled log data.

Figure 3:
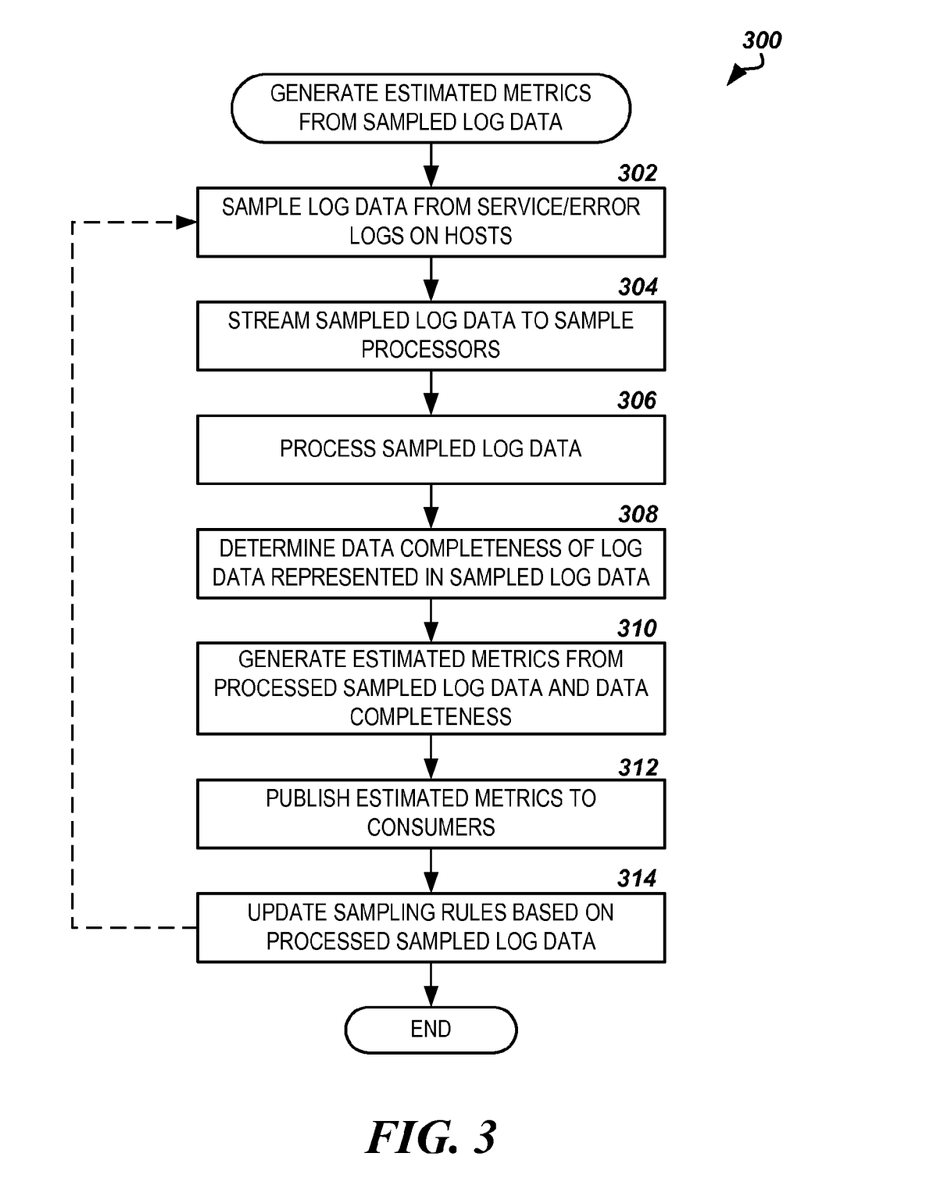
FIG. 3 is a flow diagram showing one method for incorporating streaming and/or sampling in real-time log analysis, according to embodiments described herein.

Turning now to FIG. 3, additional details will be provided regarding the embodiments presented herein for incorporating streaming and/or sampling in real-time log analysis. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts or modules. These operations, structural devices, acts and modules may be implemented in software, in firmware, in special purpose digital logic and any combination thereof. It should also be appreciated that more or fewer operations may be performed than shown in the figures and described herein. These operations may also be performed in parallel, or in a different order than those described herein.

FIG. 3 illustrates one routine 300 for sampling log data and streaming the sampled log data for real-time log analysis, according to embodiments described herein. The routine 300 may be performed by a combination of the sampling agents 202, the sample processor 208, the data accumulation tasks 124 and/or other modules and components or combination of modules and components described above in regard to FIGS. 1 and 2. The routine 300 begins at operation 302, where the sampling agents 202 on the various monitored hosts 102 sample log data from the service and error logs 104 on the hosts. In some embodiments, the sampling agent 202 may extract a representative sample of log messages from the service and error logs 104 of the host 102, such as 10% of the log messages. For example, the sampling agent 202 may utilize the hashing algorithm described above in regard to FIG. 2 to sample the log messages from the service and error logs 104. In additional embodiments, the sampling agent 202 may utilize sampling rules 204 to apply "smart" sampling logic to the log messages of the service and error logs 104, as further described above in regard to FIG. 2. For example, the sampling rules 204 may comprise regular expressions ("regex") that allow patterns in the service and error logs 104 to be matched in order to sample or extract data from targeted log messages that have been identified as being of particular interest.

From operation 302, the routine 300 proceeds to operation 304, where the sampling agents 202 stream the sampled log data to the sample processors 208. The sampling agents 202 may stream the log data samples 206 containing the sampled data to the sample processors 208 using a multicast protocol, for example. It will be appreciated that, while some log data samples 206 may be lost in the stream due to the nature of the multicast protocols, the amount of data lost is usually very low and will likely not affect the accuracy of the estimated metrics 212 calculated from the sampled log data. In addition, the sampling agents 202 may hash a value present in every sampled log message, such as a request ID or timestamp, and include the hash value in each log data sample 206. This may allow the sample processors 208 to "listen" for log data samples 206 in the stream containing specific hash value(s), so that processing of the log data samples 206 may be load-balanced across multiple sample processors 208 and/or log processing server(s) 112.

The routine 300 proceeds from operation 304 to operation 306, where the sample processors 208 process the sampled log data in the log data samples 206. For example, the sample processors 208 may split the sampled log data in the log data samples 206 into log data files 114 and data cubes 118, as described above in regard to FIGS. 1 and 2. In some embodiments, the sampled log data may be accumulated in the log data files 114 and data cubes 118 over a configured interval, such as one minute. However, the sampled log data in the log data files 114 and data cubes 118 may be made available to the data accumulation tasks 124 right away for collation and loading into the merged cubes 126, eliminating the latency added by the configured period of time that the data accumulation tasks wait to allow the log data chunks 108 from the various hosts 102 to arrive at the log processing server(s) 112 data and to be processed by the log processors 110, as described above in regard to FIG. 1.

From operation 306, the routine 300 proceeds to operation 308, where the sample processors 208 determine the data completeness 210 of the sampled log data processed as a percentage or proportion of the total log data for the configured interval. The data completeness 210 may be determined based on the percentage of log messages sampled, the number of data log samples 206 received in the interval and the like. These values may be computed by the sample processors 208 and/or provided by the sampling agents 202, for example. In addition, the sampling rules 204 currently being used by the sampling agents 202 may additionally or alternatively be used to determine the data completeness 210, or to determine separate data completeness values for different metrics. For example, if log messages related to a particular error have a smaller inclusion rate than other log messages based on the applicable sampling rules 204 currently in effect, then the data completeness 210 value determined with respect to any metric calculated for the particular error may be adjusted accordingly.

The routine 300 proceeds from operation 308 to operation 310, where the data accumulation tasks 124 utilize the sampled log data loaded into the merged cubes 126 and the data completeness 210 to calculate the estimated metrics 212. Next, at operation 312, the data accumulation tasks 124 may publish the estimated metrics 212 to consumers that subscribe to the estimated metrics. This may include the monitoring/alerting service(s) 132, the host management service(s) 134, the reporting services 136, the long term storage 138, and other consumers 140, as described above in regard to FIG. 2. It will be appreciated that while the estimated metrics 212 may represent an estimate of the value of the metrics 128 based on the sampled log data and the data completeness 210, the estimated metrics may be available to consumers with a latency on the order of seconds, instead of the 8 to 10 minutes described above in regard to the RTLA system shown in FIG. 1.

From operation 312, the routine 300 proceeds to operation 314, where the sample processors 208 and/or the data accumulation tasks 124 may determine patterns or trends in the sampled log data and generate new or updated sampling rules 204 which may then be fed back to the sampling agents 202, as discussed above in regard to FIG. 2. This may allow for a feedback loop to be implemented that allows the data accumulation tasks 124 to recognize patterns in the log data that indicate a pending event or events, such as a pending failure, and adjust the sampling process to generate more pertinent data for the event(s). From operation 314, the routine 300 ends.

While embodiments are described herein for sampling service and error logs 104 on monitored hosts 102 to calculate estimated metrics 212 regarding the condition or operation of the services on the hosts, it will be appreciated that the embodiments described herein may be utilized to obtain samples and recognize patterns in any data stream and to calculate associated estimated metrics in real-time with very little latency, especially when the exact value of the metric is not as important to trends in the metric that can be predictors of certain situations or events. For example, specific sampling rules 204 could be pushed to the monitored hosts that match a specific fatal signature and an estimated metric calculated for the rate of the fatal signature in real-time. This may allow for alerting on patterns or trends in the rate of the fatal signature that foretell a pending failure. In another example, an RTLA system could report estimated metrics such as the top-ten viewed or purchased products at an e-commerce site, the top-ten articles moving up the list in popularity on a news site and the like in real time.

In other embodiments, smart sampling may be utilized to identify and collect specific information regarding the monitored hosts 102. For example, consumers of an RTLA system monitoring GPS-enabled mobile hosts 102 may push a sampling rule 204 to the hosts that will collect and transmit sampled log data indicating that the host is located at a particular location, such as a particular business. The RTLA system may then alert the consumer through a monitoring/alerting service 132, for example, causing the consumer to automatically issue a coupon to the user of the mobile host located in that particular location in real-time. In further embodiments the sampling and streaming methods for RTLA described herein may be utilized to sample location logs for GPS-enabled mobile hosts 102 and identify or predict traffic problems at certain locations in real-time, to sample the logs of security devices in order to detect an attack or break-in in real-time and the like.

Figure 4:
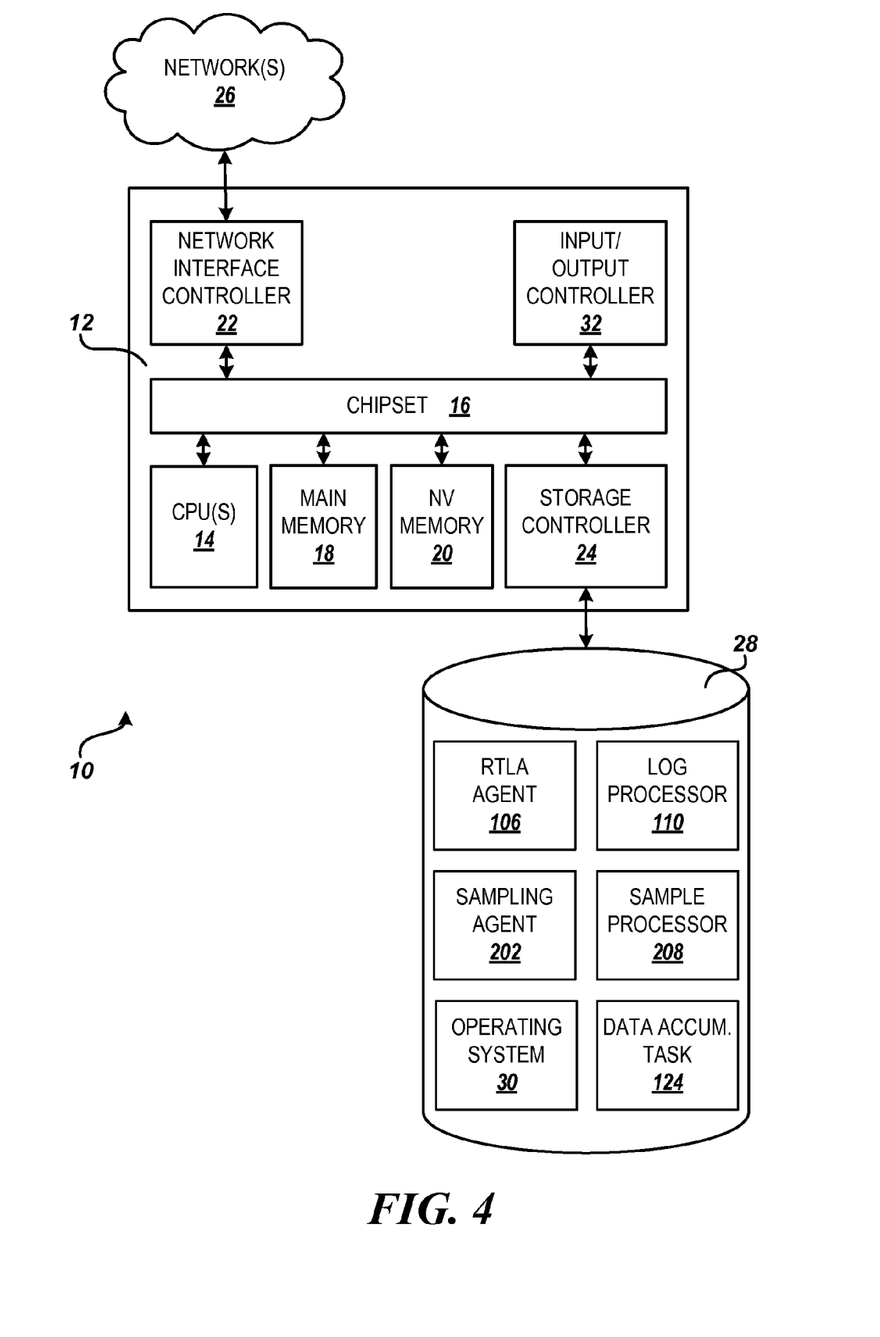
FIG. 4 is a computer architecture diagram showing an illustrative computer hardware architecture for computing devices described in embodiments presented herein.

FIG. 4 shows an example computer architecture 10 for a computer 12 capable of executing the software components described herein incorporating streaming and/or sampling in real-time log analysis, in the manner presented above. The computer architecture 10 shown in FIG. 4 illustrates a conventional server computer, workstation, desktop computer, laptop, PDA, electronic book reader, digital wireless phone, network appliance, set-top box or other computing device, and may be utilized to execute any aspects of the software components presented herein described as executing on the hosts 102, the log processing server(s) 112, the data accumulation server(s) 122 or other computing platforms.

The computer 12 includes a baseboard, or "motherboard," which is a printed circuit board to which a multitude of components or devices may be connected by way of a system bus or other electrical communication paths. In one illustrative embodiment, one or more central processing units ("CPUs") 14 operate in conjunction with a chipset 16. The CPUs 14 are standard programmable processors that perform arithmetic and logical operations necessary for the operation of the computer 12.

The CPUs 14 perform the necessary operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units or the like.

The chipset 16 provides an interface between the CPUs 14 and the remainder of the components and devices on the baseboard. The chipset 16 may provide an interface to a random access memory ("RAM") 18, used as the main memory in the computer 12. The chipset 16 may further provide an interface to a computer-readable storage medium such as a read-only memory ("ROM") 20 or non-volatile RAM ("NVRAM") for storing basic routines that help to startup the computer 12 and to transfer information between the various components and devices. The ROM 20 or NVRAM may also store other software components necessary for the operation of the computer 12 in accordance with the embodiments described herein.

According to various embodiments, the computer 12 may operate in a networked environment using logical connections to remote computing devices and computer systems through one or more networks 26, such as a local-area network ("LAN"), a wide-area network ("WAN"), the Internet or any other networking topology known in the art that connects the computer 12 to remote computers. The chipset 16 includes functionality for providing network connectivity through a network interface controller ("NIC") 22, such as a gigabit Ethernet adapter. For example, the NIC 22 may be capable of connecting the computer 12 to other computing devices over the network(s) 26, such as the hosts 102, the log processing server(s) 112 or the data accumulation server(s) 122 described above in regard to FIG. 1. It should be appreciated that any number of NICs 22 may be present in the computer 12, connecting the computer to other types of networks and remote computer systems.

The computer 12 may be connected to a mass storage device 28 that provides non-volatile storage for the computer. The mass storage device 28 may store system programs, application programs, other program modules and data, which are described in greater detail herein. The mass storage device 28 may be connected to the computer 12 through a storage controller 24 connected to the chipset 16. The mass storage device 28 may consist of one or more physical storage units. The storage controller 24 may interface with the physical storage units through a serial attached SCSI ("SAS") interface, a serial advanced technology attachment ("SATA") interface, a fiber channel ("FC") interface or other standard interface for physically connecting and transferring data between computers and physical storage devices.

The computer 12 may store data on the mass storage device 28 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 28 is characterized as primary or secondary storage, or the like. For example, the computer 12 may store information to the mass storage device 28 by issuing instructions through the storage controller 24 to alter the magnetic characteristics of a particular location within a magnetic disk drive unit, the reflective or refractive characteristics of a particular location in an optical storage unit, or the electrical characteristics of a particular capacitor, transistor or other discrete component in a solid-state storage unit. Other transformations of physical media are possible without departing from the scope and spirit of the present description, with the foregoing examples provided only to facilitate this description. The computer 12 may further read information from the mass storage device 28 by detecting the physical states or characteristics of one or more particular locations within the physical storage units.

In addition to the mass storage device 28 described above, the computer 12 may have access to other computer-readable medium to store and retrieve information, such as program modules, data structures or other data. It should be appreciated by those skilled in the art that computer-readable media can be any available media that may be accessed by the computer 12, including computer-readable storage media and communications media. Communications media includes transitory signals. Computer-readable storage media includes volatile and non-volatile, removable and non-removable storage media implemented in any method or technology for the non-transitory storage of information. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

The mass storage device 28 may store an operating system 30 utilized to control the operation of the computer 12. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized.

The mass storage device 28 may store other system or application programs and data utilized by the computer 12, such as the RTLA agent 106, the sampling agent 202, the log processor 110, the sample processor 208 or the data accumulation task 124, each of which was described above in regard to FIGS. 1 and 2. In one embodiment, the mass storage device 28 or other computer-readable storage media may be encoded with computer-executable instructions that, when loaded into the computer 12, may transform the computer from a general-purpose computing system into a special-purpose computer capable of implementing the embodiments described herein. These computer-executable instructions transform the computer 12 by specifying how the CPUs 14 transition between states, as described above. According to one embodiment, the computer 12 may have access to computer-readable storage media storing computer-executable instructions that, when executed by the computer, perform the routine 300 for incorporating streaming and/or sampling in real-time log analysis, as described above in regard to FIG. 3.

The computer 12 may also include an input/output controller 32 for receiving and processing input from a number of input devices, such as a keyboard, a mouse, a touchpad, a touch screen, an electronic stylus or other type of input device. Similarly, the input/output controller 32 may provide output to a display device, such as a computer monitor, a flat-panel display, a digital projector, a printer, a plotter or other type of output device. It will be appreciated that the computer 12 may not include all of the components shown in FIG. 4, may include other components that are not explicitly shown in FIG. 4, or may utilize an architecture completely different than that shown in FIG. 4.

Based on the foregoing, it should be appreciated that technologies for incorporating streaming and/or sampling in real-time log analysis are presented herein. Although the subject matter presented herein has been described in language specific to computer structural features, methodological acts and computer readable media, it is to be understood that the invention defined in the appended claims is not necessarily limited to the specific features, acts or media described herein. Rather, the specific features, acts and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method of providing real-time log analysis comprising:
   hashing, by one or more monitored hosts, a value in log messages comprising log files on the one or more monitored hosts;
   tagging, by the one or more monitored hosts, each of the log messages with the hashed value;
   extracting, by the one or more monitored hosts, representative samples of log data from the log files, each of the representative samples of log data comprising at least a portion of a log message extracted from the log files based on the tagged hashed value;
   streaming, by the one or more monitored hosts, the representative samples of log data to a plurality of log processors;
   processing, by the plurality of log processors, the representative samples of log data;
   determining, by the plurality of log processors, a data completeness of the representative samples of log data processed, the data completeness comprising an indication of a proportion of total log data represented by the representative samples of log data;
   merging and collating, by a data accumulation computer, the representative samples of log data;
   generating, by the data accumulation computer, an estimated metric value from the merged and collated representative samples of log data based on the data completeness; and
   publishing, by the data accumulation computer, the estimated metric value to consumers.

2. The computer-implemented method of claim 1, wherein extracting the representative samples of log data from the log files comprises applying one or more sampling rules to log messages in the log files, each of the one or more sampling rules comprising a pattern to be matched to at least a portion of the data in the log messages.

3. The computer-implemented method of claim 2, further comprising recognizing, by the data accumulation computer, patterns in representative samples of log data and generating updated sampling rules to be sent to the one or more monitored hosts.

4. The computer-implemented method of claim 1, wherein the streaming of the representative samples of log data to the plurality of log processors is performed in real-time and wherein the generation and publishing of the estimated metrics are performed in near real-time.

5. The computer-implemented method of claim 1, wherein each of the plurality of log processors is configured to receive representative samples of log data comprising one or more specific hashed values.

6. The computer-implemented method of claim 1, wherein the data completeness is determined based on information received from the one or more monitored hosts.

7. A computer-implemented method of providing real-time log analysis comprising:
   sampling, at one or more monitored hosts, log data from log files on the one or more monitored hosts;
   streaming, by the one or more monitored hosts, the sampled log data to at least one log processor;
   processing, by the at least one log processor, the sampled log data;
   determining, by the at least one log processor, a data completeness of the sampled log data stored processed, the data completeness comprising an indication of a proportion of total log data represented by the sampled log data;
   merging and collating, by a data accumulation computer, the sampled log data;
   generating, by the data accumulation computer, an estimated metric value from the merged and collated sampled log data based on the data completeness; and
   publishing, by the data accumulation computer, the estimated metric value to consumers.

8. The computer-implemented method of claim 7, wherein the sampled log data is streamed in log data samples, each log data sample comprising at least a portion of a log message sampled from the log files.

9. The computer-implemented method of claim 8, further comprising:
   hashing, by the one or more monitored hosts, a value in the log message comprising each log data sample;
   tagging, by the one or more monitored hosts, each log data sample with the hashed value; and
   streaming, by the one or more monitored hosts, each of the log data samples to a target log processor based on the tagged hashed value.

10. The computer-implemented method of claim 7, wherein sampling the log data from the log files comprises utilizing a hashing algorithm to extract a representative sample of log messages from the log files.

11. The computer-implemented method of claim 7, wherein sampling the log data from the log files comprises utilizing a statistical sampling method to extract a representative sample of log messages from the log files.

12. The computer-implemented method of claim 7, wherein sampling the log data from the log files comprises applying one or more sampling rules to log messages in the log files, each of the one or more sampling rules comprising a pattern to be matched to at least a portion of the data in the log messages.

13. The computer-implemented method of claim 12, wherein the one or more sampling rules comprise regular expressions.

14. The computer-implemented method of claim 12, further comprising recognizing, by the data accumulation computer, patterns in representative samples of log data and generating updated sampling rules to be sent to the one or more monitored hosts.

15. A computer-readable storage medium having computer-executable instructions stored thereon that, when executed by a host computer, cause the host computer to:
   extract representative samples of log data from log files on the host computer; and periodically transmit the representative samples of log data from the host computer to one or more log processors, wherein the one or more log processors are configured to process the representative samples of log data and to determine a data completeness of the representative samples of log data processed, and wherein the processed representative samples of log data and the data completeness are utilized to generate an estimated metric value that is published to consumers in near real-time.

16. The computer-readable storage medium of claim 15, wherein extracting representative samples of log data from the log files comprises utilizing a hashing algorithm to extract a representative sample of log messages from the log files.

17. The computer-readable storage medium of claim 15, wherein extracting representative samples of log data from the log files comprises utilizing a statistical sampling method to extract a representative sample of log messages from the log files.

18. The computer-readable storage medium of claim 17, wherein extracting the representative sample of log messages comprises extracting a configured percentage of log messages written to the log files.

19. The computer-readable storage medium of claim 15, wherein extracting representative samples of log data from the log files comprises applying one or more sampling rules to log messages in the log files, each of the one or more sampling rules comprising a pattern to be matched to at least a portion of the data in the log messages.

20. The computer-readable storage medium of claim 19, wherein the one or more sampling rules comprise regular expressions.

21. The computer-readable storage medium of claim 15, wherein each of the representative samples of log data comprise at least a portion of a log message sampled from the log files, and wherein the representative samples of log data are streamed from the host computer the one or more log processors using a multicast protocol.

22. The computer-readable storage medium of claim 21, having further computer-executable instructions stored thereon that cause the host computer to:
hash a value in the log message comprising each representative sample of log data;
tag each representative sample of log data log with the hashed value; and
stream each of the representative samples of log data to a target log processor based on the tagged hashed values.

23. A system for incorporating streaming in real-time log analysis, the system comprising:
a host computer;
an agent executing on the host computer and configured to tag log messages in log files on the host computer with a tag value,
extract log data from the log files, the extracted log data comprising at least a portion of a log message extracted from the log files, and
stream the extracted log data to a log processor;
at least one server computer;
the log processor executing on the at least one server computer and configured to retrieve the extracted log data from the stream,
process the extracted log data by accumulating the log data over a configured interval, and
determine a data completeness of the processed log data, the data completeness indicating a proportion of total log data for the configured interval retrieved by the log processor; and
an accumulation task executing on the at least one server computer and configured to
merge and collate the processed log data,
generate an estimated metric value from the merged and collated log data based on the data completeness; and
publish the estimated metric value to consumers in near real-time.

24. The system of claim 23, wherein the extracted log data is streamed from the host computer the log processor using a multicast protocol.

25. The system of claim 23, wherein the tag values comprise values hashed from a value in each of the log messages.

26. The system of claim 23, wherein the agent is further configured to stream the extracted log data to one of a plurality of log processors the tag values.

27. The system of claim 23, wherein extracting the log data comprises extracting a representative sample of log data from the log files based on the tag values.

28. The system of claim 23, wherein extracting the log data comprises extracting a representative sample of log data from the log files utilizing a statistical sampling method.

29. The system of claim 23, wherein extracting the log data comprises applying one or more sampling rules to log messages in the log files, each of the one or more sampling rules comprising a pattern to be matched to at least a portion of the data in the log messages.

30. The system of claim 29, wherein the one or more sampling rules comprise regular expressions.

31. The system of claim 29, wherein the accumulation task is further configured to recognize patterns in the extracted log data and generate updated sampling rules to be sent to the agent.

* * * * *